United States Patent [19]

Takano

[11] Patent Number: 4,976,657

[45] Date of Patent: Dec. 11, 1990

[54] BELT-TYPE STEPLESS SPEED SHIFTING APPARATUS

[75] Inventor: Hiroshi Takano, Miki, Japan

[73] Assignee: Mitsuboshi Belting Ltd., Japan

[21] Appl. No.: 377,150

[22] Filed: Jul. 10, 1989

[51] Int. Cl.⁵ ............................................. F16H 11/02
[52] U.S. Cl. ...................................... 474/13; 474/19; 474/25
[58] Field of Search .................................... 474/11–13, 474/17, 18, 25, 28, 69, 70

[56] References Cited

U.S. PATENT DOCUMENTS

| | | | |
|---|---|---|---|
| 2,623,400 | 12/1952 | Davis | 474/13 X |
| 4,425,102 | 1/1984 | Huff et al. | 474/19 X |

FOREIGN PATENT DOCUMENTS

| | | | |
|---|---|---|---|
| 0251756 | 1/1988 | European Pat. Off. | 474/13 |
| 0040150 | 3/1982 | Japan | 474/13 |

Primary Examiner—Thuy M. Bui
Attorney, Agent, or Firm—Wood, Phillips, Mason, Recktenwald & Vansanten

[57] ABSTRACT

A belt-type stepless speed shifting transmission consisting of: (1) an input section having an input shaft with a rotational axis, a stationary pulley piece fixedly mounted on the input shaft, a pulley piece mounted on the input shaft and movable axially relative to the input shaft and stationary pulley piece with the stationary and movable pulley pieces cooperatively defining a groove for reception of a belt, and bearing structure for exerting an axial force on the movable pulley piece in the direction of the stationary pulley piece which axial force increases with the speed of the input shaft; and (2) an output section having an output shaft with a rotational axis, a second stationary piece fixedly mounted on the output shaft, a second pulley piece mounted on the output shaft and movable axially relative to the output shaft and second stationary pulley piece with the second stationary and movable pulley pieces cooperatively defining a groove for reception of a belt, a stop element, and cooperating cams on the second movable pulley piece and stop element for effecting relative axial shifting between the second movable and stationary pulley pieces upon the second movable pulley piece being rotated relative to the stop element.

24 Claims, 7 Drawing Sheets

BELT-TYPE STEPLESS SPEED SHIFTING APPARATUS

BACKGROUND OF THE INVENTION

1. Field of the Invention

This invention relates to belt-type stepless speed shifting transmission systems, as used on vehicles such as automobiles, motorcycles, and the like, and, more particularly, to a system wherein belt thrust force is automatically varied in response to vehicle speed and output load.

2. Background Art

Belt-type stepless speed shifting transmissions for motorcycles, automobiles, and the like, are known in the art. Generally, these systems employ parallel input and output shafts, each of which carries a belt-operated sheave consisting of a stationary pulley piece and a cooperating movable pulley piece. The movable and stationary pulley pieces have confronting belt-engaging surfaces cooperatively defining a V-shaped groove for the reception of a V-belt which is trained about the input and output sheaves. Varying the axial "thrust force" on the belt, by shifting the movable pulley parts relative to the cooperating stationary pulley parts, varies the effective sheave diameters and, as an incident thereof, the speed ratios of the input and output shafts varies. In conventional systems, the thrust force on the belt is generally developed through hydraulic pressure or a spring force acting on the pulley piece pairs.

Often, these prior art structures are quite complicated. For example, U.S. Pat. No. 4,601,680 shows a system wherein hydraulic pressure is developed on the side of a movable pulley piece, with the amount of pressure dictated by an electronic controller. A large quantity of data needs to be inputted into the controller and such systems generally require a significant number of sensors. The overall system may be quite complicated and expensive as the number and sophistication of components increase. With complexity, the potential for failure also increases.

Another drawback with prior art systems of the type utilizing biasing springs, and the like, is that these systems are commonly not sensitive to minor variations in vehicle speed and load. Further, such systems generally react poorly to abrupt acceleration.

SUMMARY OF THE INVENTION

The present invention is specifically directed to overcoming the above enumerated problems in a novel and simple manner.

It is the principal object of the present invention to provide a belt-type transmission system having input and output sheaves which self-adjust to produce desired speed ratios in response to variations in rotational velocity of, and load on, shafts carrying the sheaves.

Another object of the invention is to provide a system that rapidly responds to changing operating conditions and sets a desired speed ratio for parallel drive and driven shafts. This speed selection is accomplished by varying the effective diameter of the sheaves carried by the shafts and about which a drive belt is trained. The inventive system is also sensitive to relatively small variations in vehicle speed and load.

To accomplish the above ends, the present invention contemplates a belt-type stepless speed shifting transmission consisting of:

(1) an input section having an input shaft with a rotational axis, a stationary pulley piece fixedly mounted on the input shaft, a pulley piece mounted on the input shaft and movable axially relative to the input shaft and stationary pulley piece with the stationary and movable pulley pieces cooperatively defining a groove for reception of a belt, and bearing structure for exerting an axial force on the movable pulley piece in the direction of the stationary pulley piece which axial force increases with the speed of the input shaft; and (2) an output section having an output shaft with a rotational axis, a second stationary piece fixedly mounted on the output shaft, a second pulley piece mounted on the output shaft and movable axially relative to the output shaft and second stationary pulley piece with the second stationary and movable pulley pieces cooperatively defining a groove for reception of a belt, a stop element, and cooperating cams on the second movable pulley piece and stop element for effecting relative axial shifting between the second movable and stationary pulley pieces upon the second movable pulley piece being rotated relative to the stop element.

The bearing structure on the input section can take any of a number of different forms and preferably acts directly against a surface on the movable pulley piece that is angularly oriented with respect to a plane at right angles to the input shaft axis so that radially outward movement of the bearing structure produces an axial force component on the angularly oriented pulley piece surface. In one embodiment, the bearing structure is a spherical metal ball, preferably made of steel or other hard material. Alternatively, the bearing structure can be one or more spherical or non-spherical elements, a powder, or any other structure which is freely movable radially outwardly of the input shaft under the influence of centrifugal forces.

The speed ratio between the input and output shafts is determined by the effective relative diameters of the input sheave/pulley and the output sheave/pulley. The closer together the cooperating movable and stationary pulley pieces are, the smaller is the belt groove defined thereby and the larger is the effective pulley/sheave diameter. The separate thrust forces, developed by the movable pulley pieces on the input and output shafts, balanced against each other, dictate the relative speed ratio of the shafts for a given speed and load.

With the inventive structure, at start-up, the centrifugal force on the bearing structure is small at the input side and the thrust force produced by the movable pulley part on the belt at the input section is minimal. There is, however, a relatively large torque applied to the pulley at the output side, which causes the movable pulley on the output shaft to rotate relative to the fixed pulley on the output shaft so that a large thrust force is developed on the belt, resulting in the belt groove width on the output side diminishing to produce a large effective diameter of the output pulley. Positive drive of the output shaft thus occurs.

As the input shaft speed increases, the centrifugal force on the bearing structure is increased, resulting in an increased thrust force on the belt at the input section, thereby tending to diminish the belt groove width at the input section and increase the effective diameter of the input pulley. As an incident of the acceleration, the torque on the output pulley decreases and the effective diameter of the output pulley progressively decreases with increasing speed of the output shaft.

A further aspect of the invention is the provision of cooperating cam structures on the input section which produce an axial force opposite to that from the bearing structure upon the movable pulley piece rotating relative to the shaft on the input section, to thereby rapidly accommodate abrupt acceleration.

If the vehicle is abruptly accelerated, the cooperating cam structures on the input section tend to increase the width of the input belt groove to produce a large torque on the output sheave. Once the input shaft speeds up, the bearing structure overcomes the force of the cooperating cam structures on the input side and the effective diameter of the input sheave increases while the effective diameter of the output sheave decreases.

If the engine speed is raised by idling the engine with the clutch engaged, the input side speed shifting pulley is first started with a large torque applied to the output pulley so that the effective diameter of the output pulley increases and the effective diameter of the input pulley decreases. As the torque on the output pulley is decreased, the cam thrust force generated at the output section is reduced, the thrust force from the centrifugal bearing structure on the input side speed shifting pulley is increased and the effective pulley diameter change is in the opposite direction for high speed, low torque drive.

The invention also contemplates that an augmenting bias be applied to the second movable pulley piece to increase the belt thrust force by the pulley at the output side. This force may be developed by a coil spring, hydraulic structure, a combination of hydraulic structure and springs, or other suitable biasing structure.

Another aspect of the invention is the provision of a coil spring to impart a resilient, rotational bias to one of the movable pulley pieces. In one form of the invention, the movable pulley piece on the input section is freely rotatable relative to the input shaft and a coil spring is interposed between the movable pulley piece and input shaft so as to resiliently limit rotation of the movable pulley piece relative to the input shaft.

Another aspect of the invention is the provision of a bearing within the belt groove on the input pulley to space a belt from the stationary and movable pulley pieces on the input pulley so that with the belt groove width on the input pulley above a predetermined width the bearing causes the belt to be disengaged from the pulley pieces on the input section so that the input pulley acts as a clutch.

A further aspect of the invention is the provision of axial biasing structure for the movable pulley piece on the input section. The bias force can either augment or counter the axial force developed on the movable pulley piece by the bearing structure during operation.

DETAILED DESCRIPTION OF THE DRAWINGS

Figure 1:
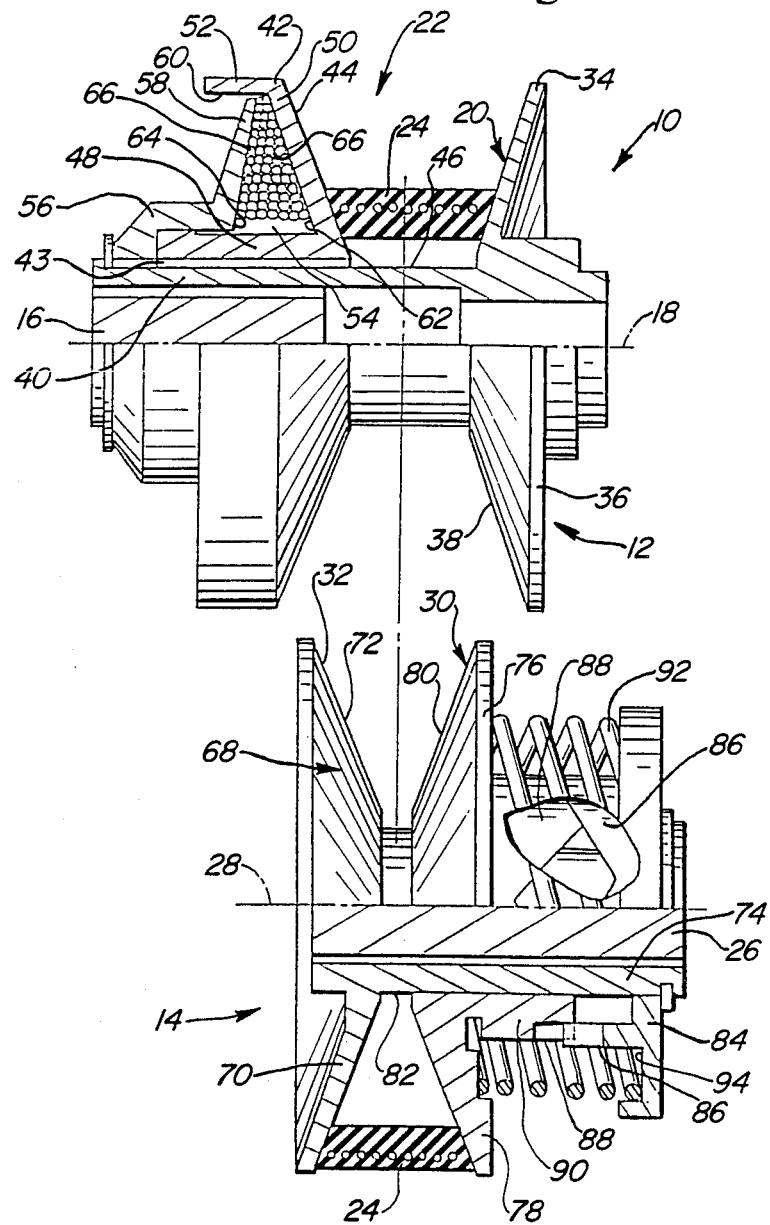
FIG. 1 is a schematic, partial section view showing a belt-type speed shifting transmission according to the present invention.

The invention will initially be described with respect to an exemplary belt-type stepless speed shifting transmission, shown at 10 in FIG. 1. The transmission 10 consists of an input section 12 and an output section 14. The input section 12 has a shaft 16, which is rotatable about an axis 18. The shaft 16 carries a multi-part sheave/pulley 20 defining a generally V-shaped groove 22 for a transmission V-belt 24.

The output section 14 has a shaft 26 rotatable about an axis 28 extending parallel to the axis 18. The shaft 26 carries a multi-part sheave 30 defining a V-shaped groove 32 for the belt 24.

The sheave 20 on the input section 12 has a stationary sheave/pulley piece 34 conventionally fixed against both axial and rotational movement relative to the shaft 16. The stationary pulley piece 34 has a radially enlarged flange 36 with a frusto-conical belt engaging surface 38 and an integral, elongate, cylindrical extension 40, in coaxial relationship with the shaft 16.

A movable pulley piece 42 surrounds the extension 40 and is keyed, as by splines 43, to the extension 40 so as to be movable axially relative to the pulley piece 34 and fixed against rotation relative thereto. The pulley piece 42 has a frusto-conical belt-engaging surface 44 which, in conjunction with the belt surface 38 and peripheral surface 46 on the extension 40, defines the belt groove 22.

The pulley piece 42 has a cylindrical body 48, which is keyed to the extension 40 against rotation by the splines 43, a radially extending flange 50, defining the belt engaging surface 44, and an annular skirt 52 projecting axially from the radially outermost portion of the flange 50. The body 48, flange 50 and skirt 52 cooperatively bound an axially opening space 54 radially outwardly of the shaft 16.

A stationary backing element 56 surrounds the extension 40 and closes the space 54. The backing element 56 has a flange 58 with a radial extent slightly less than the radially inwardly facing surface 60 on the skirt 52, so that the flange 58 and skirt 52 can be placed in axially overlapping relationship. Axially facing surfaces 62, 64 on the flanges 50, 58 bound the space 54 and converge in a radial direction.

A plurality of spherical elements 66, preferably of steel, are located in the space 54 and confined cooperatively by the pulley piece 42 and the backing element 56. In operation, centrifugal forces, developed by rotation of the shaft 16, cause the spherical elements 66 to move radially outwardly, as shown in FIG. 1. As the rotational velocity of the shaft 16 increases, the spherical elements 66 squeeze between the axially facing surfaces 62, 64 and thereby wedge the pulley piece 42 to the right in FIG. 1, which increases the effective diameter of the pulley/sheave 20.

The illustrated spherical elements 66 are only exemplary of one structure for bearing against and exerting an axial force on the pulley piece 42. The number of spherical elements is determined by the desired centrifugal force. That is, for a larger force, more spherical elements are utilized. A single element, such as a steel sphere, might be used. Alternatively, square materials, powders, irregular shapes and the like may be utilized in place of the spherical elements 66. If a steel sphere is utilized, preferably the diameter of such sphere is approximately 2.5 millimeters in diameter, thereby taking up approximately 60–100% of the volume of the space 54, and preferably approximately 90% thereof. The configuration and alignment of the facing surfaces 62, 64 is also varied depending upon the desired thrust force requirements.

On the output section 14, a stationary pulley part 68 is provided and consists of a flange 70, defining a frusto-conical belt engaging surface 72, and an integral cylindrical extension 74 in coaxial relationship with the axis 28. The pulley part 68 is conventionally fixed to the shaft 26 against both rotational and axial movement. A movable pulley part 76 surrounds an extension 74 of the pulley part 68 and is guided thereby in relative axial movement, as by splines. The pulley part 76 has a radially enlarged flange 78 having a belt engaging frusto-conical surface 80 facing the surface 32, and defining in conjunction therewith and the radially outwardly facing surface 82 on the extension 74, the belt groove 32.

A stop element 84 is secured fixedly to the shaft 26. The stop element 84 is generally cylindrical in configuration and has a cam element 86 adjacent its free end which meshes and cooperates with a cam element 88 on a cylindrical body 90 on the movable pulley part 76 so that rotation of the movable pulley part 76 relative to the stop element 84 causes the pulley part 76 to move axially with respect to the stationary pulley part 68. Each cam element 86, 88 preferably comprises a plurality of interlocking teeth, as described more fully with respect to FIG. 3 below.

At start-up, with a load on the shaft 26, operation of the belt 24 effects rotation of the movable pulley part 76 relative to the stop element 84. The coacting cam elements 86, 88, upon such relative rotation occurring in either direction, cause the pulley part 76 to be shifted towards the stationary pulley part 68, thereby diminishing the width of the belt groove 32. The result is that the effective diameter of the sheave 30 is increased.

To augment the axial camming force on the pulley part 76, a coil spring 92 is provided. The spring 92 is compressed between the flange 78 on the pulley part 76 and a facing wall surface 94 on the stop element 84 and normally biases the movable pulley part 76 toward the stationary pulley part 68.

The operation of the system 10 in FIG. 1 is as follows. At start-up, the spherical elements 66 in the space 54 reside radially inwardly due to the absence of centrifugal forces at the moment of start-up, and therefore do not exert any appreciable axial force on the movable pulley teeth 42. However, the torque on the pulley part 76 at start-up is high and results in the movable pulley part 76 being rotated relative to the stop element 84 and shifted axially through the cam elements 86, 88 so as to diminish the width of the belt groove 32. As this occurs, the effective diameter of the sheave 30 is increased. Whatever centrifugal force is generated by the spherical elements 66 is overcome by the axial force generated by the cooperating cam elements 86, 88. As the rotational velocity of the shaft 16 increases, the spherical elements 66 are urged radially outwardly, thereby wedging the movable pulley part 42 axially so as to diminish the width of the groove 22 and thereby increase the effective diameter of the sheave 20. This draws the belt 24 into the groove 32, thereby increasing the width of the groove 32 and reducing the effective diameter of the output sheave 30 for high speed operation.

The configuration of each groove 22, 32, and the resulting speed ratio for the shafts 16, 20, is determined by balancing the axial forces on the movable pulley parts 42, 76. For example, the movable pulley piece 42 is urged axially by the axial component of centrifugal forces developed on the wall 62 by the spherical elements 66. At the output section, the axial force tending to diminish the width of groove 32 is a combination of the cam force developed by the cam elements 86, 88 and the axial force developed by the spring 92.

Figure 2:
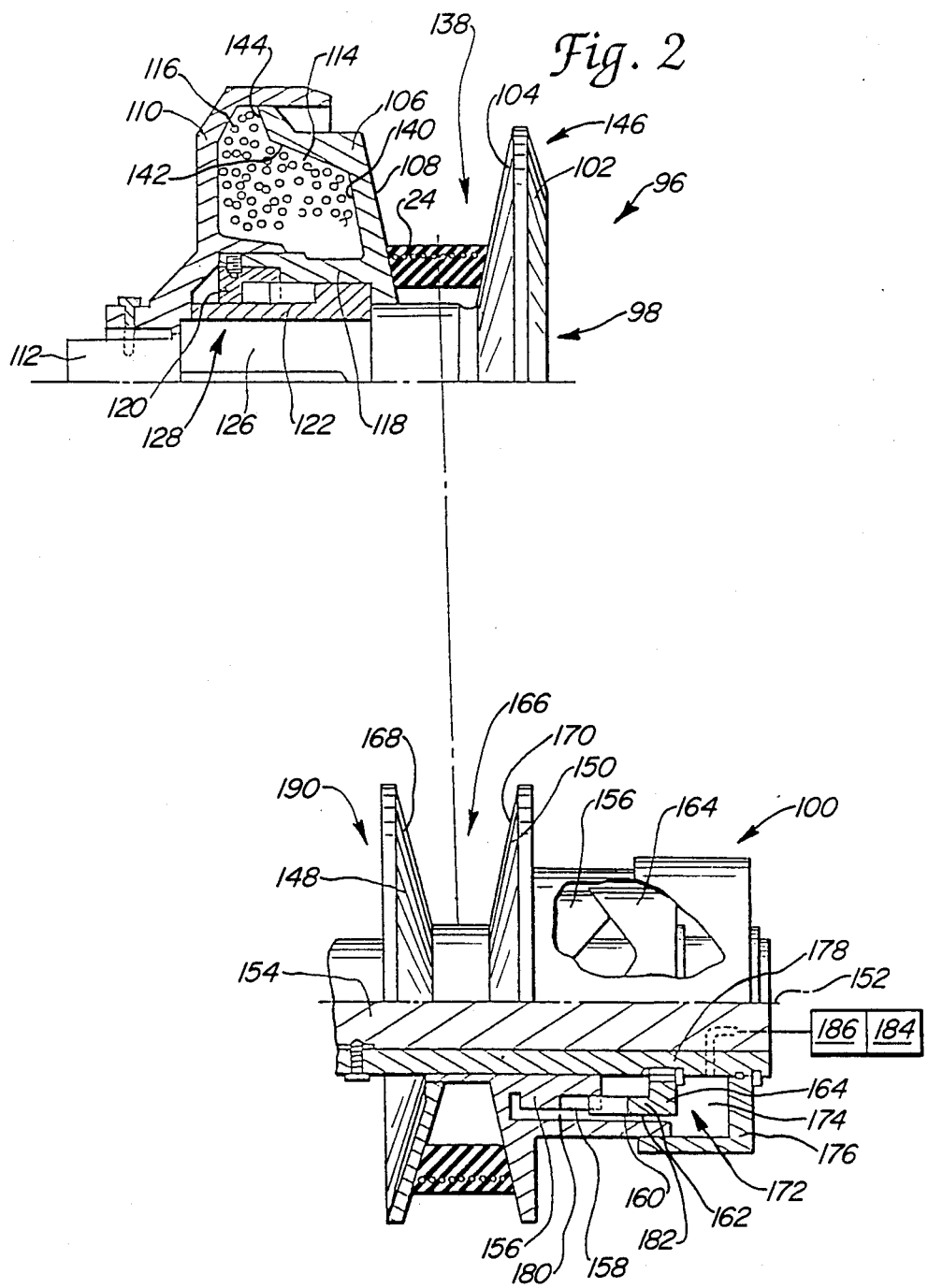
FIG. 2 is a schematic, partial section view of a modified form of speed shifting transmission according to the present invention.

A modified stepless speed shifting transmission, according to the invention, is shown at 96 in FIG. 2. The transmission 96 consists of an input section 98 and an output section 100. As in the prior embodiment, the input section 98 has a fixed pulley part 102, with a belt engaging surface 104, cooperating with a movable pulley part 106, having a belt engaging surface 108. A blocking element 110 is fixedly secured to an input shaft 112 against both rotation and axial movement. The pulley part 106 and blocking element 110 cooperatively define a space 114 for a force imparting bearing material 116, which may take any of a variety of forms, as previously described with respect to the FIG. 1 embodiment. The movable pulley piece 106 has a cylindrical section 118, to which a cam piece 120 is bolted. A cooperating cam piece 122 is fixedly secured to a part 126 of the shaft 112.

Figure 3:
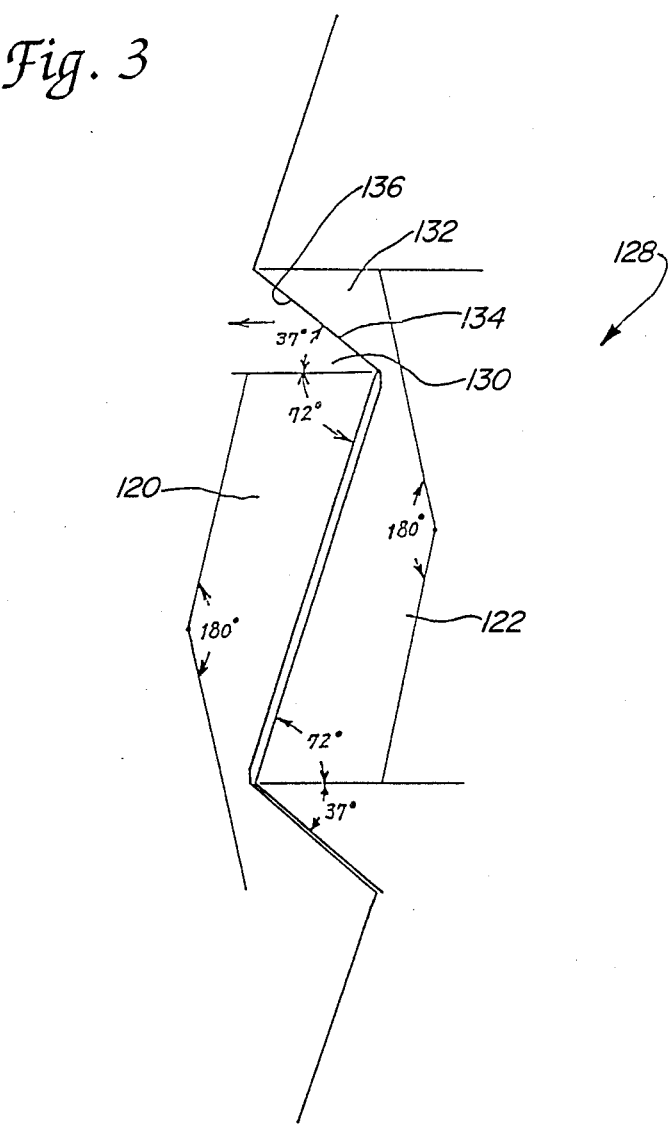
FIG. 3 is a schematic view showing a preferred form of cooperating cam teeth on relatively movable elements on an output section of the speed shifting transmission of FIG. 2, which movable elements act to vary the belt groove width on an output pulley.

The cooperating torque transmitting unit, consisting of the cooperating cam pieces 120, 122, is shown at 128 in FIGS. 2 and 3. A plurality of teeth 130 on the cam piece 120 mesh with teeth 132 on the cam piece 122. Relative rotation between the cam pieces 120, 122 causes oblique edges 134, 136 on the cam pieces 120, 122, respectively, to interact so as to effect axial shifting of the movable pulley part 106. This relative rotation, in either direction, causes the pulley part 106 to be shifted towards the stationary pulley part 102 so as to diminish the width of the pulley groove 138 bounded by the belt engaging surfaces 104, 108. The preferred configuration for the teeth 130, 132 on the cam pieces 120, 122, respectively, is shown in FIG. 3. The cam thrust force generated is controlled by the angle of the edges 134, 136 to give a desired output i.e. maximum output with fuel efficiency.

As the input shaft 112 is rotated, the force imparting material 116 is borne against inclined, axially facing surfaces 140, 142, 144 on the pulley part 106, thereby urging the movable pulley part 106 towards the stationary pulley part 102 to diminish the width of the pulley groove 138 and thereby increase the effective diameter of the input sheave at 146. Relative rotation between the stationary pulley part 102 and movable pulley part 106 urges the movable pulley part 106 axially oppositely to the direction of urging caused by the force imparting material 116 acting against the movable pulley part 106 and thus the thrust force on the belt 24 is equal to the difference between the developed opposite axial forces.

The output section 100 consists of a stationary pulley part 148 and a cooperating pulley part 150 that is movable guidingly against the stationary pulley part 148 axially relative thereto and the axis 152 of the output shaft 154. The pulley piece 150 has a cylindrical section 156 with cam teeth 158 thereon, which teeth 158 mesh with cam teeth 160 on a cylindrical portion 162 of a cam piece 164, fixed to the shaft 154. As in the prior embodiment, relative rotation between the movable pulley part 150 and shaft 154 effects axial shifting of the movable pulley part 150 so as to diminish the width of the belt groove 166 defined by confronting surfaces 168, 170 on the pulley parts 148, 150, respectively.

To augment the axial force of the movable pulley part 150 towards the stationary pulley part 148, a hydraulic cylinder arrangement is provided at 172. A hydraulic chamber 174 is defined by a casing 176 in conjunction with a fixed extension 178 of the stationary pulley part 148 and the cam piece 164. A fluid passageway 180 is defined in the movable pulley part 150. A fluid entryway 182 defined between the cam piece 164 and casing 176 communicates between the chamber 174 and the passageway 180. Hydraulic fluid is controllably supplied to the chamber 174 from a supply 184, shown schematically in FIG. 2. Delivery of the fluid is controlled by a conventional control 186, shown schematically in FIG. 2. The axial force on movable pulley part 150 is a combination of the force from the cooperating cam teeth 158, 160 and the force from the hydraulic cylinder 172.

With the described arrangement, acceleration of the input shaft 112 forces the bearing material 116 radially outwardly to exert an axial force component on the pulley part 106, which force is countered by a force developed by the torque transmitting unit 128 as the belt 24, surrounding the input sheave 146 and output sheave 190, is operated. With the thrust force on the input sheave 146 increased, the effective diameter of the input sheave 146 is increased, resulting in an effective decreased diameter of the output sheave 190.

When the vehicle is abruptly accelerated, the thrust force developed on the belt 24 at the input section 98 is greater than the thrust force at the output section 100, resulting in the effective diameter of the input sheave 146 to be increased to automatically adjust the speed shifting ratio to that necessary for abrupt acceleration.

Figure 4:
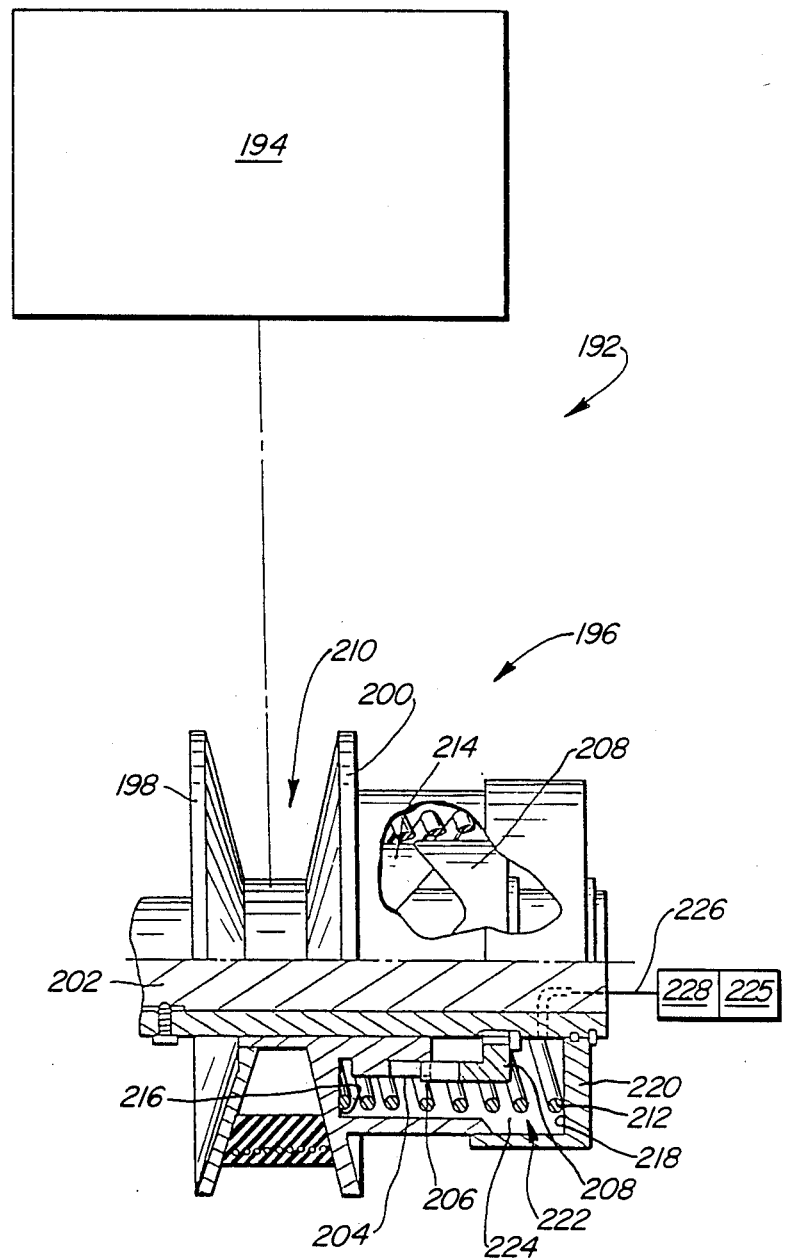
FIG. 4 is a schematic, partial section view of a further modified form of speed shifting transmission according to the present invention.

In FIG. 4, a modified form of stepless speed shifting transmission, according to the present invention, is shown at 192 and consists of an input section at 194 that is the same as the input section 98 in FIG. 2. The output section 196 consists of a stationary sheave part 198 and a movable sheave part 200 that is guided in axial movement relative to the stationary sheave part 200 and an output shaft 202. As in the FIG. 2 output section 100, the output section 196 has cooperating cam teeth 204, 206 on the movable sheave part 200 and on a cam piece 208, respectively. The cam piece 208 is fixedly secured to the output shaft 202. Rotational movement of the movable pulley part 200 relative to the shaft 202 causes the interacting cam teeth 204, 206 to effect axial shifting of the pulley part 200 so as to diminish the width of the pulley groove 210.

The movable pulley part 200 is further biased by a coil spring 212 surrounding a cylindrical portion 214 of the movable pulley part 200 and the cam piece 208 and interposed between an axially facing wall surface 216 on the movable pulley part 200 and a facing wall surface 218 on a cylindrical casing 220 fixed relative to the shaft 202. The spring 212 develops an axial force that augments the force tending to move the pulley part 200 to diminish the width of the pulley groove 210.

The axial force on the pulley part 200 is further augmented by a hydraulic cylinder arrangement at 222. A hydraulic chamber 224 is defined cooperatively by the pulley part 200, the cam piece 208 and the casing 220. A pressurized supply of hydraulic fluid 224 is introduced through a conduit 226 to the chamber 224. The delivery of fluid from the supply 224 is controlled by a conventional type control 228.

The thrust force developed on movable pulley part 200 is a combination of the force developed by the cooperating cam teeth 204, 206, the force from the spring 212 and that from the hydraulic cylinder arrangement 222.

FIGS. 5–9 show modified forms of input sections, according to the present invention. In each variation of the input sections, the contemplated output section is as is shown in FIGS. 1, 2 and 4, and thus the description thereof will be omitted herein. Elements in the output sections of FIGS. 5–9, the same as those in FIGS. 1, 2 and 4, are correspondingly numbered.

Figure 5:
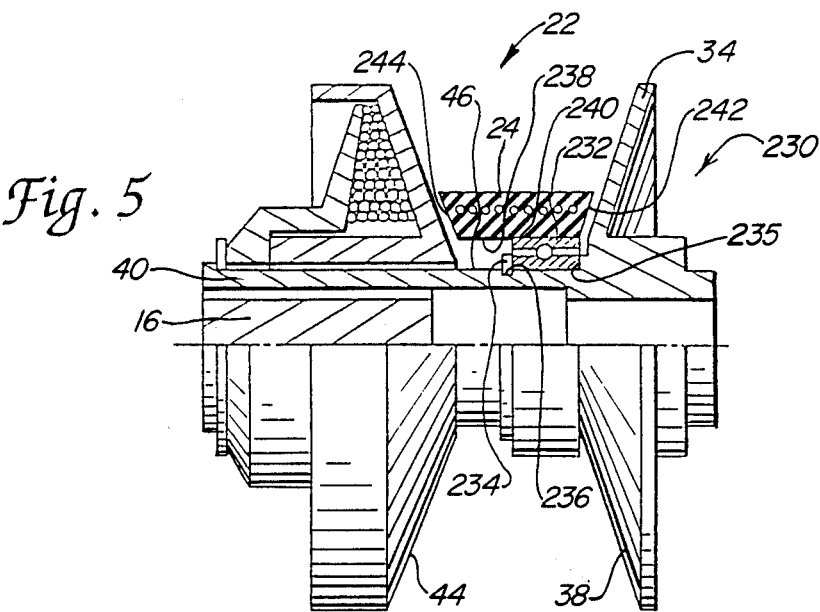
FIG. 5 is a schematic, partial section view of a modified form, of input section on a speed shifting transmission according to the present invention.

In FIG. 5, a modified input section from that in FIGS. 1, 2 and 4 is shown at 230. The variation resides in the provision of a bearing 232 at the bottom of the pulley groove 22. The bearing 232 closely surrounds the peripheral surface 46 on the extension 40 and is maintained against axial shifting by a ring element 234 seated in an undercut 236 on the extension 40 and a shoulder 235 on the pulley part 34. Driving of the input shaft 16 is interrupted upon the inwardly facing surface 238 of the belt 24 facially engaging the radially outwardly facing surface 240 of the bearing, whereupon the oppositely facing side edges 242, 244 on the belt 24 disengage from the belt engaging surfaces 38, 44.

Figure 6:
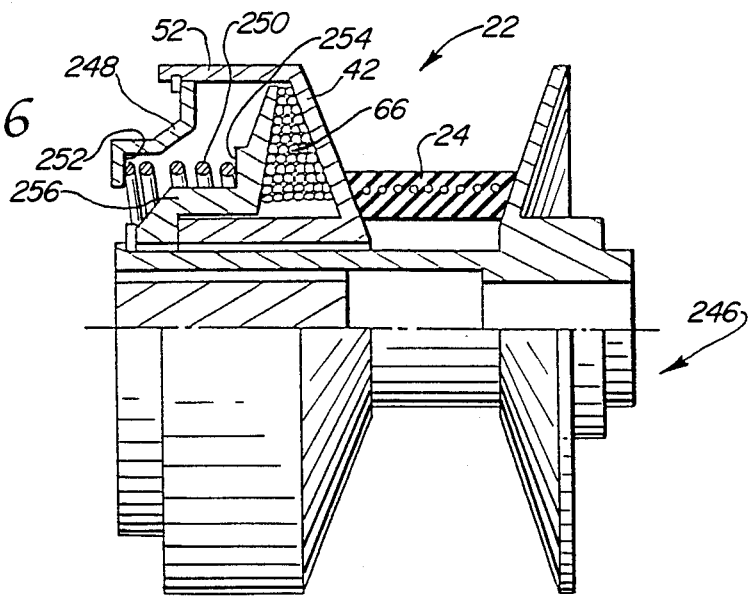
FIG. 6 is a schematic partial section view of a further modified form of input section according to the present invention.

In FIG. 6, a further modified input section, according to the present invention, is shown at 246. The input section 246 is modified from that shown in FIG. 1. A spring retainer 248 extends radially inwardly from the skirt 52 associated with the movable pulley piece 42. A coil spring 250 is interposed between an axially facing surface 252 on the spring retainer 248 and an oppositely facing surface 254 on a backing elements 256, that is slightly modified from the backing element 56 in the FIG. 1 embodiment. The coil spring 250 biases the spring retainer 248, and thereby the attached pulley piece 42, so as to increase the width of belt groove 22. The thrust force on the pulley part 42 is equal to the force developed by the spherical elements 66 minus the axial force developed by the spring 250.

Figure 7:
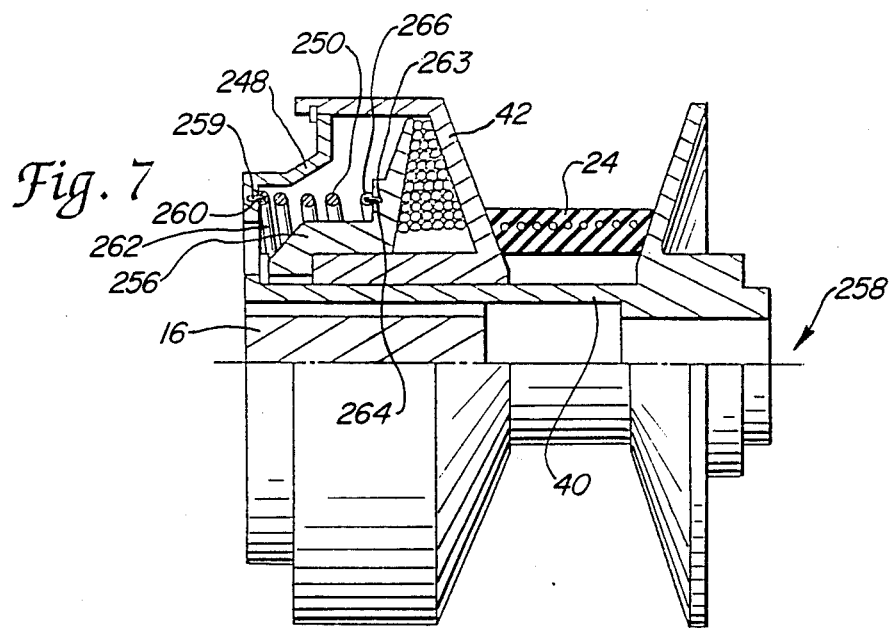
FIG. 7 is a schematic, partial section view of a further modified form of input section according to the present invention.

A further modified form of input section is shown at 258 in FIG. 7. The FIG. 7 input section 258 is slightly modified from that in FIG. 6. The principal difference is that the movable pulley part 42 is free to both rotate and shift axially relative to the pulley part extension 40. The coil spring 250 is interposed between the spring retainer element 248 and the fixed backing element 256. The end turns on the spring 250 are connected to the spring retainer 248 and backing element 256. To accomplish this, a pin 259 is embedded in the spring retainer 248 and projects into an opening 260 in the spring turn 262. A like pin 262 embedded in backing element 256 projects into an opening 264 in the spring turn 266. The result is that the pulley piece 42 is resiliently restrained against rotation relative to the shaft 16 by the spring 250.

Figure 8:
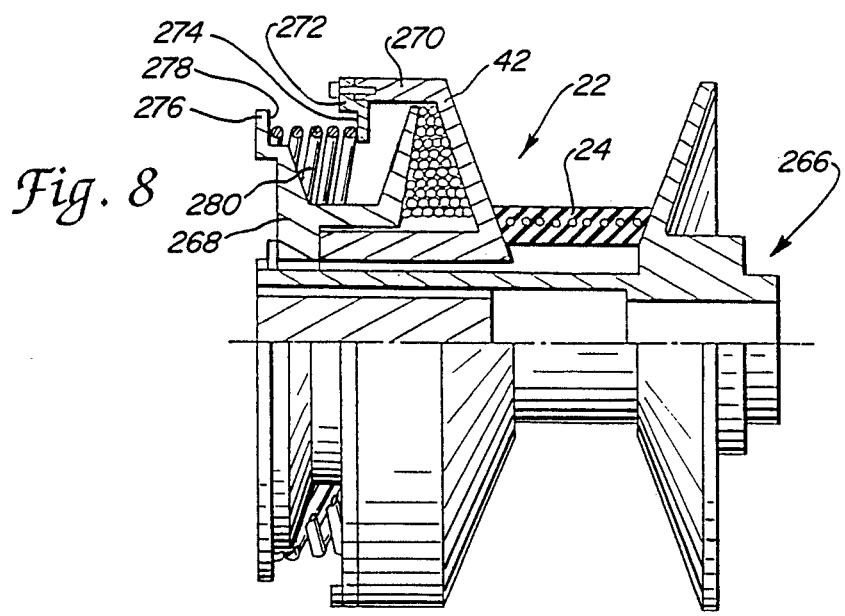
FIG. 8 is a schematic, partial section view of a further modified form of input section according to the present invention.

A further modified input section, according to the present invention, is shown at 266 in FIG. 8. The FIG. 8 embodiment is similar to that in FIG. 1 with modifications to a backing element 268, corresponding to the backing element 56 in FIG. 1, and to a skirt 270, corresponding to the skirt 52 on the movable pulley piece 42. The skirt 270 has a spring retention element 272 fixedly attached thereto and extending radially inwardly therefrom. The retainer element 272 defines an axially facing surface 274. The backing element 268 has a free end 276 defining a surface 278, facing axially oppositely to and in radial coincidence with, the surface 274. A coil spring 280 is interposed between the surfaces 274, 278 and exerts a bias on the movable pulley piece 42 tending to diminish the width of the groove 22.

Figure 9:
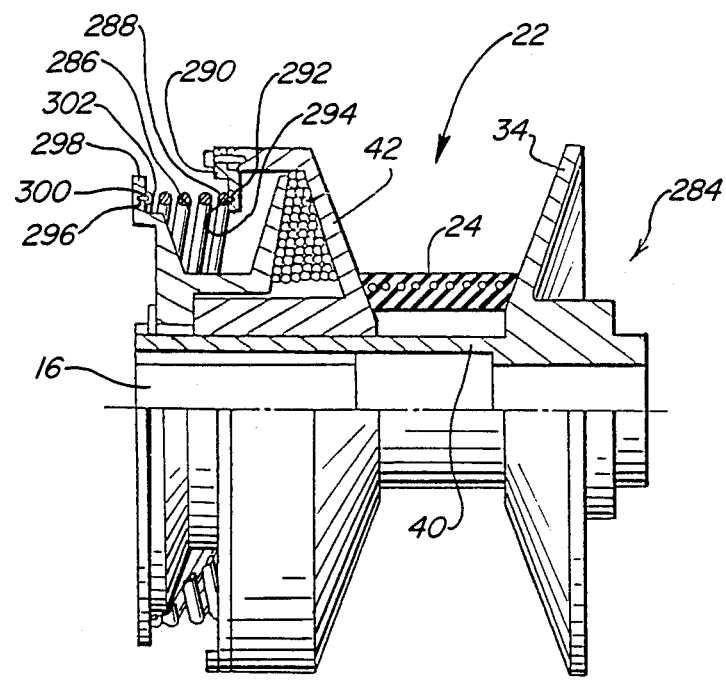
FIG. 9 is a schematic, partial section view of a still further modified form of input section according to the present invention.

A still further modified form of input section is shown at 284 in FIG. 9. The input section 284 is similar to that in FIG. 8, however the movable pulley piece 42 is freely rotatable as well as movable axially relative to the extension 40 on the stationary pulley piece 34. The movable pulley piece 42 is resiliently limited in rotation by a coil spring 286. One turn 288 of the spring 286 is fixed against rotation relative to the spring retainer element 290, corresponding to the element 272 in FIG. 8, by a pin 292, embedded in the retainer element 290 and projecting into an opening 294 in the turn 288. A similar pin 296, embedded in a backing element 298, projects into an opening 300 in one turn 302 of the spring 286. The result is that rotation of shaft 16 is transmitted through the backing element 298 and the spring 286 to the movable pulley piece 42. As in the embodiment in FIG. 8, the coil spring 286 exerts an axial force on the movable pulley piece 42 tending to diminish the width of the belt groove 22.

The foregoing disclosure of specific embodiments is intended to be illustrative of the broad concepts comprehended by the invention.

I claim:

1. A belt-type stepless speed shifting transmission comprising:
    an input section having
        an input shaft with a rotational axis;
        a stationary pulley piece fixedly mounted on said input shaft;
        a pulley piece mounted on said input shaft and movable axially relative to said stationary pulley piece,
        said stationary and movable pulley pieces cooperatively defining a groove for reception of a belt; and
        bearing means for exerting an axial force on said movable pulley piece in the direction of said stationary pulley piece, said axial force increasing with the rotational velocity of the input shaft; and
    an output section having
        an output shaft with a rotational axis;
        a second stationary piece fixedly mounted on said output shaft;
        a second pulley piece mounted on said output shaft and movable axially relative to said second stationary pulley piece,
        said second stationary and movable pulley pieces cooperatively defining a second groove for reception of a belt;
        a stop element carried by said output shaft; and
        cooperating cam means on said second movable pulley piece and stop element for effecting relative axial shifting between said second movable and stationary pulley pieces upon said second movable pulley piece being rotated relative to said stop element,
    whereby at a predetermined rotational speed of said output shaft, said bearing means exerts an axial force on said movable pulley piece at the input section tending to diminish the width of the belt groove on the input section and with a predetermined load on said output shaft operation of a belt trained about the pulley pieces on the input and output sections causes said second movable pulley piece to rotate relative to said stop element so as to thereby cause the second movable pulley piece to be urged axially relative to the second stationary pulley piece to diminish the width of the second belt groove.

2. The stepless speed shifting transmission according to claim 1 wherein said bearing means comprises a spherical element.

3. The stepless speed shifting transmission according to claim 1 wherein said bearing means comprise a plurality of elements.

4. The stepless speed shifting transmission according to claim 1 wherein said bearing means comprises a powder.

5. The stepless speed shifting transmission according to claim 1 wherein a biasing means is provided for normally urging the second movable pulley piece axially relative to the second stationary pulley piece so as to diminish the width of the belt groove defined between the second movable and stationary pulley pieces.

6. The stepless speed shifting transmission according to claim 5 wherein said biasing means comprises a coil spring.

7. The stepless speed shifting transmission according to claim 5 wherein said biasing means comprises hydraulic means.

8. The stepless speed shifting transmission according to claim 6 wherein means are provided for mounting the coil spring to at least one of the input and output sections so that said coil spring imparts a rotational bias to said movable pulley piece relative to the shaft on the one of the input and output sections.

9. The stepless speed shifting transmission according to claim 1 including a bearing within the belt groove on at least one of input and output sections to space a belt from the stationary and movable pulley pieces on the one of the input and output sections so that with the belt groove width on the one of the input and output sections above a predetermined width the bearing causes a belt to be disengaged from the pulley pieces on the one of the input and output sections.

10. The stepless speed shifting transmission according to claim 1 including a biasing means for normally urging the movable pulley piece on the input section axially relative to the stationary pulley piece on the input section.

11. The stepless speed shifting transmission according to claim 10 wherein the biasing means comprises a coil spring which urges the movable pulley piece on the input section axially with respect to the input shaft so that the width of the belt groove on the input section tends to be increased.

12. A belt-type stepless shifting transmission comprising:
an input section having
an input shaft with a rotational axis;
a first pulley piece mounted on said input shaft;
a second pulley piece mounted on said input shaft and movable axially relative to said first pulley piece,
said first and second pulley pieces cooperatively defining a first groove for reception of a belt;
bearing means for exerting an axial force on one of said first and second pulley pieces in response to rotation of said input shaft so as to tend to urge said one pulley piece towards the other of the first and second pulley pieces and thereby diminish the width of the first belt groove,
said axial force increasing with the rotational velocity of the input shaft; and
an output section having
an output shaft with a rotational axis;
a third pulley piece mounted on said output shaft;
a fourth pulley piece mounted on said output shaft and movable axially relative to said third pulley piece,
said third and fourth pulley pieces cooperatively defining a second groove for reception of a belt; and
means for causing said fourth pulley piece to be urged axially relative to said third pulley piece to diminish the width of the second belt groove upon a predetermined torque being exerted on said third and fourth pulley pieces by a belt in said second belt groove.

13. The stepless speed shifting transmission according to claim 12 wherein said bearing means comprises a powder.

14. The stepless speed shifting transmission according to claim 12 wherein said bearing means comprises a plurality of spherical elements.

15. A belt-type stepless shifting transmission comprising:
an input section having
an input shaft with a rotational axis;
a stationary pulley piece fixedly mounted on said input shaft;
a pulley piece mounted on said input shaft and movable axially relative to said input shaft,
said stationary and movable pulley pieces cooperatively defining a groove for reception of a belt;
bearing means for exerting an axial force on said movable pulley piece tending to move the movable pulley piece relative to the stationary pulley piece so as to diminish the width of the belt groove,
said axial force increasing with the rotational velocity of the input shaft; and
means for normally urging said movable pulley piece in an axial direction; and
an output section having
a second stationary pulley piece fixedly mounted on said output shaft;
a second pulley piece mounted on said output shaft and movable axially relative to said output shaft,
said second stationary and movable pulley pieces cooperatively defining a second groove for reception of a belt; and
means for causing said second movable pulley piece to be urged relative to said second stationary pulley piece thereby tending to diminish the width of the second belt groove upon a predetermined torque being exerted on said second movable pulley piece by a belt in said second belt groove.

16. The stepless speed shifting transmission according to claim 12 wherein means are provided for normally biasing the second movable pulley piece relative to the second stationary pulley piece so as to diminish the width of the second belt groove.

17. The stepless speed shifting transmission according to claim 16 wherein the biasing means comprises a coil spring.

18. The stepless speed shifting transmission according to claim 16 wherein the biasing means comprises a coil spring and a hydraulic means.

19. The stepless speed shifting transmission according to claim 12 including a bearing within one of the belt grooves to space a belt from the stationary and movable pulley pieces defining the one belt groove so that with the one belt groove above a predetermined width the bearing causes a belt to be disengaged from the pulley pieces defining said one belt groove.

20. The stepless speed shifting transmission according to claim 12 wherein said movable pulley piece is rotatable relative to the stationary pulley piece and a coil spring cooperates between the movable pulley piece and the input shaft to resiliently limit rotation of the movable pulley piece relative to the input shaft.

21. The stepless speed shifting transmission according to claim 21 wherein said bearing means causes an axial force to be exerted on said one pulley piece on the input shaft in a first direction and means are provided for normally urging the one pulley piece on the input shaft in an axial direction.

22. The stepless speed shifting transmission according to claim 21 wherein said means for normally urging the one pulley piece on the input shaft urges the one pulley piece on the input shaft axially oppositely to said first direction.

23. The stepless speed shifting transmission according to claim 12 wherein the means for causing the fourth pulley piece to be urged axially includes means for allowing rotation of one of the third and fourth pulleys relative to the other of the third and fourth pulleys.

24. The stepless speed shifting transmission according to claim 23 wherein the means for causing the fourth pulley piece to be urged axially includes cooperating cam elements on the third and fourth pulley pieces which cause said fourth pulley piece to move axially relative to the third pulley piece as the one of the third and fourth pulley pieces rotates relative to the other of the third and fourth pulley pieces.

* * * * *